(12) United States Patent
Naito et al.

(10) Patent No.: US 7,635,529 B2
(45) Date of Patent: Dec. 22, 2009

(54) SUBSTRATE FOR MAGNETIC RECORDING MEDIA, MAGNETIC RECORDING MEDIA AND MAGNETIC RECORDING APPARATUS

(75) Inventors: Katsuyuki Naito, Tokyo (JP); Masatoshi Sakurai, Tokyo (JP); Akira Kikitsu, Yokohama (JP); Yoshiyuki Kamata, Tokyo (JP); Naoko Kihara, Matsudo (JP); Masahiro Oka, Ichihara (JP)

(73) Assignees: Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 287 days.

(21) Appl. No.: 11/475,862

(22) Filed: Jun. 28, 2006

(65) Prior Publication Data

US 2007/0003798 A1    Jan. 4, 2007

(30) Foreign Application Priority Data

Jun. 28, 2005    (JP)    ............................. 2005-188384

(51) Int. Cl.
G11B 5/71    (2006.01)
G11B 5/82    (2006.01)

(52) U.S. Cl. .................. 428/848.5; 428/848.8; 360/135

(58) Field of Classification Search .................. 428/141, 428/156, 831.2, 833.3, 835.7, 835.8, 846.9, 428/847.7, 848, 848.2, 848.5, 848.8, 63, 428/64.1, 409; 427/141, 129, 130, 131; 360/97.02, 360/110, 135; 384/124; 438/637
See application file for complete search history.

(56) References Cited

U.S. PATENT DOCUMENTS 4,343,831 A * 8/1982 Tsuji et al. .................. 427/130
5,353,182 A * 10/1994 Nakamura et al. .......... 360/135
5,381,284 A * 1/1995 Gregory et al. .......... 360/97.02
5,385,409 A * 1/1995 Ide .............................. 384/124

(Continued)

FOREIGN PATENT DOCUMENTS

CN        1922674        2/2007

(Continued)

OTHER PUBLICATIONS

Chinese Office Action dated Nov. 30, 2007 for Appln. No. 200610094256.9.

(Continued)

*Primary Examiner*—Kevin M. Bernatz
*Assistant Examiner*—Louis Falasco
(74) *Attorney, Agent, or Firm*—Pillsbury Winthrop Shaw Pittman, LLP (57) ABSTRACT

According to one embodiment, a substrate for a magnetic recording media has circumferential protrusions corresponding to recording tracks and circumferential recesses corresponding to grooves between the recording tracks, in which the substrate satisfying at least one of conditions of (a) a surface of the recess has a surface energy smaller than that of the protrusion, (b) the surface of the recess is modified with a thermally decomposable or deformable substance, (c) the surface of the recess has surface roughness smaller than that of the protrusion, (d) crystal orientation is more disturbed on the surface of the recess than on the protrusion, (e) the surface of the recess is modified with a substance that causes reaction with a magnetic material or that diffuses into the magnetic material, and (f) the surface of the recess is modified with a substance soluble in a solvent or with a deformable substance.

7 Claims, 4 Drawing Sheets

U.S. PATENT DOCUMENTS

| | | | |
|---|---|---|---|
| 5,705,253 A * | 1/1998 | Berg et al. | 428/141 |
| 6,168,845 B1 | 1/2001 | Fontana, Jr. et al. | |
| 6,238,796 B1 * | 5/2001 | Liu et al. | 428/833.6 |
| 2003/0090833 A1 * | 5/2003 | Tani et al. | 360/110 |
| 2005/0120545 A1 | 6/2005 | Wachenschwanz et al. | |
| 2005/0282382 A1 * | 12/2005 | Ko et al. | 438/637 |

FOREIGN PATENT DOCUMENTS

| | | | |
|---|---|---|---|
| EP | 1775118 | * | 2/2007 |
| JP | 05-205257 | | 8/1993 |
| JP | 06-076278 | | 3/1994 |
| JP | 08-115519 | | 5/1996 |
| JP | 08-203058 | | 8/1996 |
| JP | 09-245345 | | 9/1997 |
| JP | 2002-359138 | | 12/2002 |
| JP | 2003-016622 | | 1/2003 |

OTHER PUBLICATIONS

Austrian Search Report dated Feb. 22, 2008 for Appln. No. 200604142-0.

Japanese Office Action dated Sep. 15, 2009 for Appln. No. 2005-188384.

* cited by examiner

SUBSTRATE FOR MAGNETIC RECORDING MEDIA, MAGNETIC RECORDING MEDIA AND MAGNETIC RECORDING APPARATUS

CROSS-REFERENCE TO RELATED APPLICATIONS

This application is based upon and claims the benefit of priority from Japanese Patent Application No. 2005-188384, filed Jun. 28, 2005, the entire contents of which are incorporated herein by reference.

BACKGROUND

1. Field

One embodiment of the present invention relates to a substrate for a magnetic recording media having protrusions and recesses formed thereon, a magnetic recording media of substrate processing type and a magnetic recording apparatus having the magnetic recording media mounted thereto.

2. Description of the Related Art

In increasing the track density of a hard disc drive (HDD), interference between the adjacent tracks has come to be a problem to be solved. In particular, how to lower fringing caused by the fringe effect of a magnetic field from the write head is a serious technical problem to be solved. A discrete track type patterned media (DTR media) in which recording tracks are physically separated makes it possible to suppress a side erase phenomenon in recording and a side read phenomenon in reproducing so as to increase markedly the density in the cross-track direction and, thus, is expected to provide a magnetic recording media capable of high density recording.

The DTR media includes a magnetic film etching type and a substrate processing type. A large number of manufacturing steps are required for obtaining the DTR media of the magnetic film etching type, leading to a high manufacturing cost. Therefore, the substrate processing type DTR media, prepared by first producing a substrate having protrusions and recesses and then depositing a magnetic film by sputtering, is suitable to mass production of the DTR media.

In the substrate processing type DTR media, however, the magnetic film is also formed on the recesses, with the result that the signal-to-noise ratio (SNR) is lowered by magnetic signals from the recesses. Under the circumstances, it is considered effective to lower the magnetic characteristics of the magnetic film present on the recesses.

A method of manufacturing a patterned media is proposed in, for example, Japanese Patent Disclosure (Kokai) No. 2002-359138. It is disclosed in this prior art that the surface of a ferromagnetic layer is selectively covered with a mask so as to permit the surface of the ferromagnetic layer to be selectively exposed to a reactive gas containing a halogen element, thereby denaturing the exposed portions. Also, a method of manufacturing a patterned media by selectively oxidizing the masked surface of the media is disclosed in U.S. Pat. No. 6,168,845. Further, proposed in Japanese Patent Disclosure No. 5-205257 is a method that ions such as nitrogen ions or oxygen ions are introduced into those regions of the magnetic layer positioned between the recording tracks of the discrete track media so as to make the magnetic layer on those regions nonmagnetic. However, it is difficult to carry out these methods.

Also proposed is a patterned media prepared by forming a multilayered Co/Pt magnetic layer on a Si substrate having protrusions and recesses; see Phys. Rev. B 62, 12271-12281 (2000). The magnetic characteristics of the Co/Pt multilayered film are highly sensitive to the multilayered structure. Specifically, a clear multilayered structure can be obtained on the protrusions and the multilayered structure is disturbed on the recesses, making it possible to form patterns. However, the particular method cannot be applied to a granular type perpendicular magnetic film.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the present invention, there is provided a substrate for a magnetic recording media, comprising: circumferential protrusions corresponding to recording tracks and circumferential recesses corresponding to grooves between the recording tracks; the substrate satisfying at least one of conditions (a) to (f) given below: (a) a surface of the recess has a surface energy smaller than that of a surface of the protrusion; (b) the surface of the recess is modified with a thermally decomposable or thermally deformable substance; (c) the surface of the recess has surface roughness smaller than that of the surface of the protrusion; (d) crystal orientation is more disturbed on the surface of the recess than on the surface of the protrusion; (e) the surface of the recess is modified with a substance that causes reaction with a magnetic material or that diffuses into the magnetic material; and (f) the surface of the recess is modified with a substance soluble in a solvent or with a deformable substance. According to another aspect of the present invention, there is provided a magnetic recording media, comprising: the above substrate for a magnetic recording media; and a granular magnetic layer formed on the substrate for the magnetic recording media, the orientation of the magnetic crystal lattice of the magnetic layer on the recess being more disturbed than that of the magnetic layer on the protrusion.

The substrate according to an embodiment of the present invention comprises circumferential protrusions and circumferential recesses formed on the surface. The protrusions correspond to the recording tracks and the recesses correspond to the grooves between the recording tracks. The surfaces of the recesses satisfy any of conditions (a) to (f) given below. If a granular magnetic layer is formed on the substrate for the magnetic recording media satisfying any of these conditions, the magnetic orientation of the magnetic layer on the recess is made smaller than that of the magnetic layer on the protrusion, making it possible to prevent the signal-to-noise ratio (SNR) from being lowered by magnetic signals from the recesses. The conditions noted above, i.e., (a) to (f), will be described in more detail.

(a) The surface of the recess has a surface energy smaller than that of the surface of the protrusion. If the surface energy is small, the bonding force between the magnetic film and the substrate is weakened so as to disturb the crystal structure controlling the magnetic orientation of the magnetic film. In order to satisfy the particular condition, the surface of the recess is modified by a surface treating agent with a low surface energy containing, for example, a fluorine atom. The surface treating agent noted above includes, for example, fluoroalkylsilane (FAS) such as tetrahydrodecyltriethoxysilane, heptadecafluoro-1,1,2,2-tetrahydrodecyltrimethoxysilane, heptadecafluoro-1,1,2,2-tetrahydrodecyltrichlorosilane, tridecafluoro-1,1,2,2-tetrahydrooctyltriethoxysilane, tridecafluoro-1,1,2,2-tetrahydrooctyltrimethoxysilane, tridecafluoro-1,1,2,2-tetrahydrooctyltrichlorosilane and trifluoropropyltrimethoxysilane.

(b) The surface of the recess is modified with a thermally decomposable material or a thermally deformable material. The thermally decomposable material includes, for example, polyethylene glycol and poly(tetramethylene glycol). Also, the thermally deformable material includes, for example, a thermoplastic polymer such as polyvinyl alcohol and polyisobutyl methacrylate.

(c) The surface of the recess has surface roughness smaller than that of the surface of the protrusion. The particular condition can be achieved by the combination of the polishing and the etching.

(d) The crystal orientation is more disturbed on the surface of the recess, compared with the surface of the protrusion. The particular condition can be achieved by controlling the irradiation of a single crystal substrate such as a silicon substrate with an ion beam.

(e) The surface of the recess is modified with a substance that causes reaction with a magnetic material or that diffuses into the magnetic material. The reactive substance includes, for example, polyvinyl chloride having chlorine atoms. Also, the substance that diffuses into the magnetic material includes, for example, Cu.

(f) The surface of the recess is modified with a substance soluble in a solvent or a deformable substance. The substance soluble in a solvent or deformable includes, for example, various polymers. It suffices to use an appropriate solvent in accordance with the kind of the polymer.

It should be noted that, in the substrate for the magnetic recording media according to the embodiment of the present invention, the difference in height between the protrusion and the recess preferably ranges between 10 and 100 nm.

In the general method of manufacturing the substrate for the magnetic recording media according to the embodiment of the present invention, the substrate is first coated with resist, followed by forming a resist pattern by imprinting or electron-beam lithography and subsequently etching the substrate so as to obtain a substrate having protrusions and recesses. In this case, the resist is left unremoved on the protrusions. In the next step, deposited are, for example, a substance having a low surface energy, a thermally decomposable substance, a thermally deformable substance, a reactive substance, and a substance soluble in a solvent, etc. It is possible to permit these substances to be left unremoved withon the recess alone by peeling off the resist on the protrusions (lift-off). In this case, it is necessary to allow these substances to be left unremoved when the resist is peeled off. To be more specific, in the case of using an organic solvent for removing the resist, it is necessary to use a substance that is not peeled off by the organic solvent. In the case of using water for peeling off the resist, it is necessary to use a substance that is not peeled by water. Further, in the case of using an oxygen asher for peeling off the resist, it is necessary to use a substance capable of withstanding the oxygen asher. By such a simple method, it is possible to manufacture a desired substrate for the magnetic recording media, a magnetic recording media (DTR media) capable of suppressing degradation of the signal-to-noise ratio (SNR) caused by magnetic signals from the recesses, and a magnetic recording apparatus including the particular magnetic recording media.

EXAMPLES

Example 1

Figure 1:
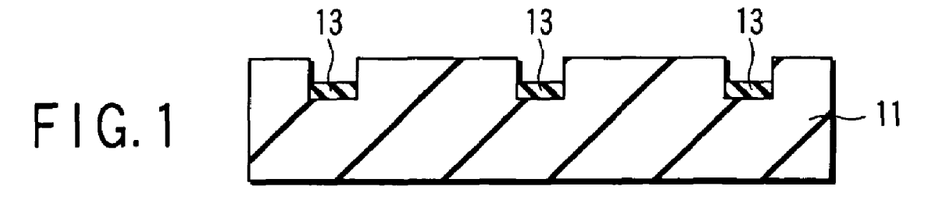
FIG. 1 is a cross-sectional view showing a substrate for a magnetic recording media (HDD substrate) according to an embodiment of the present invention.

Used in this example is a surface modifying layer having a low surface energy. FIG. 1 is a cross-sectional view showing a substrate for a magnetic recording media (hereinafter referred to as an HDD substrate) according to an embodiment of the present invention. As shown in the drawing, circumferential protrusions corresponding to the recording tracks and circumferential recesses corresponding to the grooves between the recording tracks are formed on the surface of a glass substrate 11. A surface modifying layer 13 containing fluorine is formed on the surface of the recesses.

Figure 2:
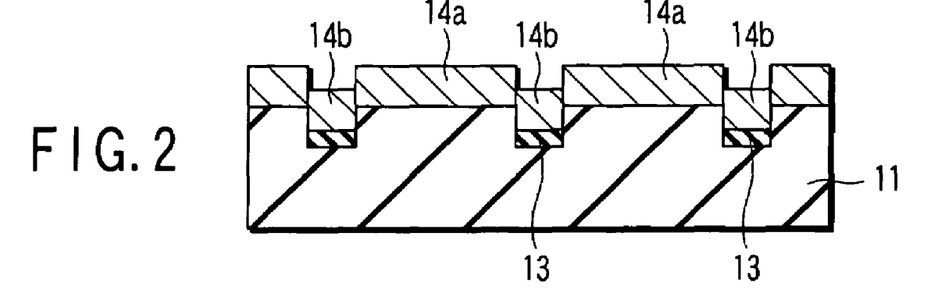
FIG. 2 is a cross-sectional view showing a magnetic recording media (DTR media) according to an embodiment of the present invention.

FIG. 2 is a cross-sectional view showing a magnetic recording media (DTR media) according to an embodiment of the present invention. As shown in the drawing, the surface modifying layer 13 is formed on the surface of the recesses of the glass substrate 11. Also, media films 14a and 14b are formed on the entire surface of the glass substrate 11. The media films include, for example, a soft underlayer, an orientation control film and a magnetic recording layer. The media film 14a denotes that formed on the protrusions (recording tracks). A magnetic recording layer satisfactory in its orientation is included in the regions of the media film 14a. Also, the media film 14b denotes that formed on the recesses (grooves). The orientation of the magnetic crystal lattice is disturbed in the region of the media film 14b.

Figure 3A:
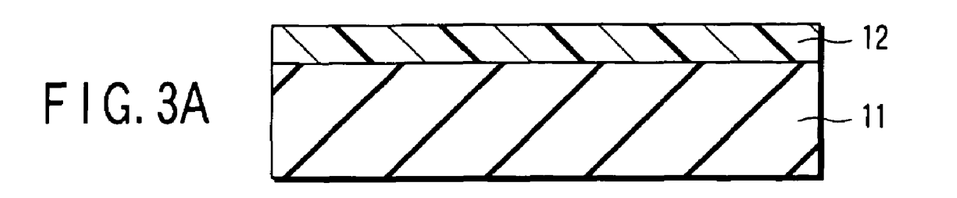
FIGS. 3A, 3B, 3C, 3D, 3E and 3F are cross-sectional views showing a method of manufacturing the HDD substrate shown in FIG. 1 and the DTR media shown in FIG. 2.
Figure 3B:
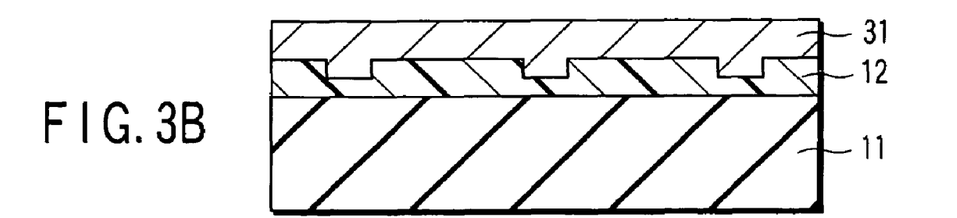
Figure 3C:
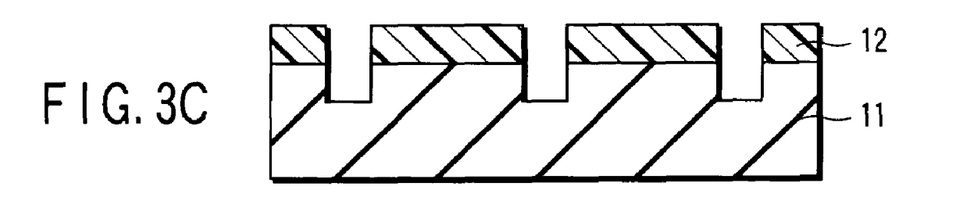
Figure 3D:
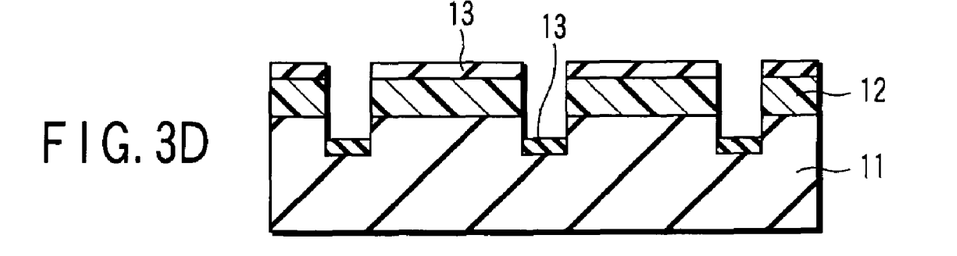
Figure 3E:
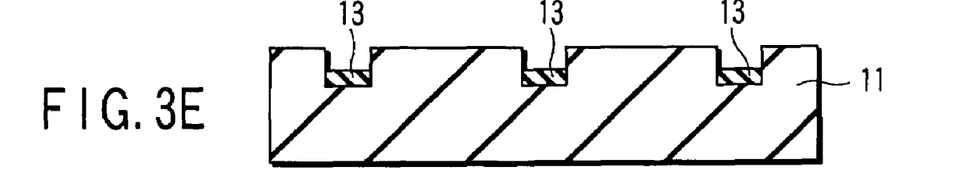

The method of manufacturing the HDD substrate shown in FIG. 1 and the DTR media shown in FIG. 2 will be described with reference to FIGS. 3A, 3B, 3C, 3D, 3E and 3F. In the first step, a polymethyl methacrylate (PMMA) film 12 is formed in a thickness of 70 nm by spin-coating on the glass substrate 11 having a diameter of 0.85 inch as shown in FIG. 3A. On the other hand, prepared is a Ni mold 31 having circumferential protrusions with a pitch of 100 nm, a top width of 35 nm and a height of 30 nm and also having protrusions corresponding to the address signals and servo signals. These protrusions are formed by electron-beam lithography and plating. The Ni mold 31 thus prepared is pressed to the PMMA film 12 so as to transfer the patterns of protrusions and recesses on the Ni mold 31 onto the PMMA film 12 as shown in FIG. 3B. After the Ni mold 31 is removed, the recesses of the PMMA film 12 are etched by Ar ion milling until the underlying glass substrate 11 is exposed. Further, the glass substrate 11 is selectively etched by RIE using a fluorine-based gas so as to transfer the patterns of protrusions and recesses on the Ni mold 31 to the glass substrate 11 as shown in FIG. 3C. In this stage, the PMMA film 12 is left unremoved on the protrusions. Then, the surface of the recess is treated with heptadecafluoro-1,1,2,2-tetrahydrodecyltrimethoxysilane, which is a surface treating agent containing fluorine atoms, so as to form the surface modifying layer 13 having a low surface energy as shown in FIG. 3D. Then, the PMMA film 12 is removed from the protrusions by a lift-off method using a solvent, thereby manufacturing the HDD substrate shown in FIG. 1. The HDD substrate thus manufactured is found to have circumferential protrusions with a pitch of 100 nm, a top width of 60 nm, and a height of 20 nm and to have patterns of protrusions and recesses corresponding to the address signals and servo signals, as shown in FIG. 3E.

Figure 3F:
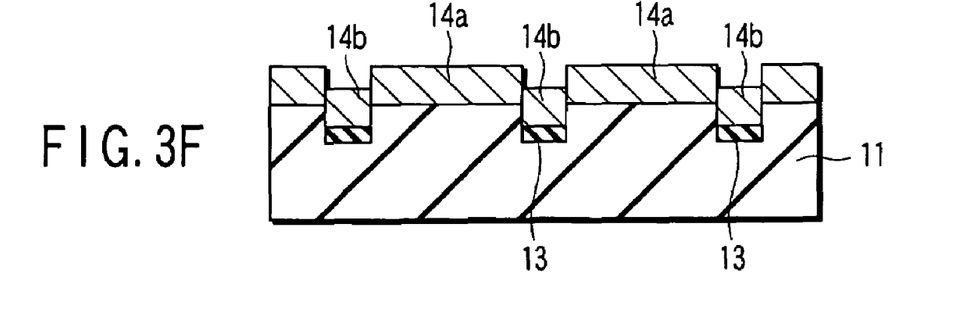

The HDD substrate is loaded in a multi-chamber sputtering apparatus so as to form a soft underlayer, an orientation control film, a perpendicular magnetic recording layer of a granular structure formed of a mixture of CoCrPt and $SiO_2$, and a carbon protective film without breaking vacuum to manufacture the DTR media shown in FIG. 2, as shown in FIG. 3F. A cross-section of the DTR media thus manufactured is observed with a TEM. The magnetic crystal lattice of the media film 14b on the recess (groove) is found to be disturbed, compared with the magnetic crystal lattice of the media film 14a on the protrusion (recording track).

It is possible to coat the DTR media with a lubricant and to store the DTR media coated with the lubricant before assembly of the HDD. This is also the case with the other Examples and Comparative Examples described in the following.

Comparative Example 1

An HDD substrate is manufactured as in Example 1, except that the treatment with a surface treating agent containing fluorine atoms is not performed. Then, a DTR media is manufactured as in Example 1 using the HDD substrate noted above. A cross-section of the DTR media thus manufactured is observed with a TEM, with the result that no change is recognized in the orientation of the magnetic crystal lattice between the recess and the protrusion.

Example 2

Used in this Example is a surface modifying layer formed of a thermally decomposable substance and soluble in a solvent. A polymethyl methacrylate (PMMA) film is formed in a thickness of 80 nm on a glass substrate having a diameter of 1 inch by spin-coating. On the other hand, prepared is a Ni mold having circumferential protrusions with a pitch of 150 nm, a top width of 50 nm and a height of 50 nm and also having protrusions corresponding to the address signals and servo signals. The Ni mold is prepared by electron-beam lithography and plating. The Ni mold is pressed to the PMMA film so as to transfer the patterns of protrusions and recesses onto the PMMA film. After the Ni mold is removed, the recess of the PMMA film is etched by Ar ion milling until the surface of the underlying glass substrate is exposed. Further, the patterns of protrusions and recesses are transferred into the glass substrate by RIE using a fluorine-based gas. In this stage, the PMMA film on the protrusion is left unremoved. In the next step, the substrate is coated by spin-coating with an aqueous solution of a thermally decomposable polyethylene glycol, followed by removing the PMMA film by a lift-off method using an organic solvent, thereby manufacturing a desired HDD substrate. The HDD substrate is found to have circumferential protrusions with a pitch of 150 nm, a top width of 90 nm and a height of 40 nm and to have patterns of protrusions and recesses corresponding to the address signals and servo signals.

The HDD substrate is loaded in a multi-chamber sputtering apparatus so as to form a soft underlayer, an orientation control film, a granular perpendicular magnetic recording layer, and a carbon protective film without breaking vacuum, thereby manufacturing a DTR media. A cross-section of the DTR media thus manufactured is observed with a TEM, with the result that the orientation of the magnetic crystal lattice on the recess is found to be disturbed, compared with that of the magnetic crystal lattice on the protrusion.

Comparative Example 2

A HDD substrate is manufactured as in Example 2, except that a film of the decomposable substance is not formed and, then, a DTR media is manufactured as in Example 2. A cross-section of the DTR thus manufactured is observed with a TEM, with the result that no change is recognized in the orientation of the magnetic crystal lattice between the recess and the protrusion.

Example 3

Used is a surface modifying layer formed of a thermally deformable substance and soluble in a solvent. Specifically, a polymethyl methacrylate (PMMA) film is formed in a thickness of 50 nm on a glass substrate having a diameter of 1.8 inches by spin-coating. On the other hand, prepared is a Ni mold having circumferential protrusions with a pitch of 150 nm, a top width of 50 nm and a height of 20 nm and also having protrusions corresponding to the address signals and servo signals. These protrusions are formed by electron-beam lithography and plating. The Ni mold is pressed to the PMMA film so as to transfer the patterns of protrusions and recesses of the Ni mold onto the PMMA film. After the Ni mold is removed, the recess of the PMMA film is etched by Ar ion milling until the surface of the underlying glass substrate is exposed. Further, the patterns of protrusions and recesses are transferred into the glass substrate by RIE using a fluorine-based gas. In this stage, the PMMA film on the protrusion is left unremoved. In the next step, the substrate is coated by spin-coating with an aqueous solution of a thermally deformable polyvinyl alcohol, followed by removing the PMMA film by a lift-off method using a solvent, thereby manufacturing a desired HDD substrate. The HDD substrate is found to have circumferential protrusions with a pitch of 150 nm, a top width of 90 nm and a height of 10 nm and to have patterns of protrusions and recesses corresponding to the address signals and servo signals.

The HDD substrate is loaded in a multi-chamber sputtering apparatus so as to form a soft underlayer, an orientation control film, a granular perpendicular magnetic recording layer, and a carbon protective film without breaking vacuum, thereby manufacturing a DTR media (Example 3A). A cross-section of the DTR media thus manufactured is observed with a TEM, with the result that the orientation of the magnetic crystal lattice on the recess is found to be disturbed, compared with that of the magnetic crystal lattice on the protrusion.

Also, the HDD substrate is loaded in a multi-chamber sputtering apparatus so as to form a soft underlayer, an orientation control film, and a granular perpendicular magnetic recording layer. Then, the HDD substrate is washed with water, followed by drying the substrate and, then, forming a carbon protective film on the substrate, thereby manufacturing a DTR media (Example 3B). A cross-section of the DTR media thus manufactured is observed with a TEM, with the result that the orientation of the magnetic crystal lattice on the recess is found to be disturbed, compared with that of the magnetic crystal lattice on the protrusion.

Example 4

Used is a surface modifying layer formed of a thermally deformable substance and soluble in a solvent. Specifically, a polyvinyl alcohol (PVA) film is formed in a thickness of 120 nm on a glass substrate having a diameter of 1.8 inches by spin-coating. On the other hand, prepared is a Ni mold having circumferential protrusions with a pitch of 150 nm, a top width of 40 nm and a height of 70 nm and also having protrusions corresponding to the address signals and servo signals. These protrusions are formed by electron-beam lithography and plating. The Ni mold is pressed to the PVA film so as to transfer the patterns of protrusions and recesses of the Ni mold onto the PVA film. After the Ni mold is removed, the recess of the PVA film is etched by Ar ion milling until the surface of the underlying glass substrate is exposed. Further, the patterns of protrusions and recesses are transferred into the glass substrate by RIE using a fluorine-based gas. In this stage, the PVA film on the protrusion is left unremoved. In the next step, the substrate is coated by spin-coating with a toluene solution of a thermally deformable polyisobutyl methacrylate, followed by removing the PVA film by a lift-off method using water, thereby manufacturing a desired HDD substrate. The HDD substrate is found to have circumferential protrusions with a pitch of 150 nm, a top width of 95 nm and a height of 60 nm and to have patterns of protrusions and recesses corresponding to the address signals and servo signals.

The HDD substrate is loaded in a multi-chamber sputtering apparatus so as to form a soft underlayer, an orientation control film, a granular perpendicular magnetic recording layer, and a carbon protective film without breaking vacuum, thereby manufacturing a DTR media (Example 4A). A cross-section of the DTR media thus manufactured is observed with a TEM, with the result that the orientation of the magnetic crystal lattice on the recess is found to be disturbed, compared with that of the magnetic crystal lattice on the protrusion.

Also, the HDD substrate is loaded in a multi-chamber sputtering apparatus so as to form a soft underlayer, an orientation control film, and a granular perpendicular magnetic recording layer. Then, the HDD substrate is washed with toluene, followed by drying the substrate and, then, forming a carbon protective film on the substrate, thereby manufacturing a DTR media (Example 4B). A cross-section of the DTR media thus manufactured is observed with a TEM, with the result that the orientation of the magnetic crystal lattice on the recess is found to be disturbed, compared with that of the magnetic crystal lattice on the protrusion.

Example 5

Used is a surface modifying layer formed of a thermally decomposable substance and soluble in a solvent. Specifically, a polyvinyl alcohol (PVA) film is formed in a thickness of 90 nm on a glass substrate having a diameter of 1.8 inches by spin-coating. On the other hand, prepared is a Ni mold having circumferential protrusions with a pitch of 100 nm, a top width of 35 nm and a height of 40 nm and also having protrusions corresponding to the address signals and servo signals. These protrusions are formed by electron-beam lithography and plating. The Ni mold is pressed to the PVA film so as to transfer the patterns of protrusions and recesses of the Ni mold onto the PVA film. After the Ni mold is removed, the recess of the PVA film is etched by Ar ion milling until the surface of the underlying glass substrate is exposed. Further, the patterns of protrusions and recesses are transferred into the glass substrate by RIE using a fluorine-based gas. In this stage, the PVA film on the protrusion is left unremoved. In the next step, the substrate is coated by spin-coating with an ethyl acetate solution of a thermally deformable poly(tetramethylene glycol), followed by removing the PVA film by a lift-off method using water, thereby manufacturing a desired HDD substrate. The HDD substrate is found to have circumferential protrusions with a pitch of 100 nm, a top width of 55 nm and a height of 25 nm and to have patterns of protrusions and recesses corresponding to the address signals and servo signals.

The HDD substrate is loaded in a multi-chamber sputtering apparatus so as to form a soft underlayer, an orientation control film, a granular perpendicular magnetic recording layer, and a carbon protective film without breaking vacuum, thereby manufacturing a DTR media (Example 5A). A cross-section of the DTR media thus manufactured is observed with a TEM, with the result that the orientation of the magnetic crystal lattice on the recess is found to be disturbed, compared with that of the magnetic crystal lattice on the protrusion.

Also, the HDD substrate is loaded in a multi-chamber sputtering apparatus so as to form a soft underlayer, an orientation control film, and a granular perpendicular magnetic recording layer. Then, the HDD substrate is washed with ethyl acetate, followed by drying the substrate and, then, forming a carbon protective film on the substrate, thereby manufacturing a DTR media (Example 5B). A cross-section of the DTR media thus manufactured is observed with a TEM, with the result that the orientation of the magnetic crystal lattice on the recess is found to be disturbed, compared with that of the magnetic crystal lattice on the protrusion.

Example 6

In this Example, the surface roughness on the surface of the recess is made smaller than that on the surface of the projection. Specifically, a glass substrate having a diameter of 1.8 inches is polished with fine particles so as to form roughness with Ra of 2 nm. Then, a polystyrene (PSt) film is formed on the glass substrate in a thickness of 100 nm by spin-coating. On the other hand, prepared is a Ni mold having circumferential protrusions with a pitch of 150 nm, a width of 50 nm and a height of 60 nm and also having protrusions corresponding to the address signals and servo signals. These protrusions are formed by electron-beam lithography and plating. The Ni mold is pressed to the PSt film so as to transfer the patterns of protrusions and recesses onto the PSt film. After the Ni mold is removed, the recess of the PSt film is etched by Ar ion milling until the surface of the underlying glass substrate is exposed. Further, the patterns of protrusions and recesses are transferred into the glass substrate by RIE using a fluorine-based gas. As a result, the roughness Ra on the surface of the recess of the glass substrate is lowered to 0.5 nm. In the next step, the PSt layer is removed with an oxygen asher so as to obtain a desired HDD substrate. The HDD substrate is found to include circumferential protrusions with a pitch of 150 nm, a top width of 90 nm and a height of 45 nm and is also found to include an irregularity corresponding to the address signals and servo signals.

The HDD substrate is loaded in a multi-chamber sputtering apparatus so as to form a soft underlayer, an orientation control film, a granular perpendicular magnetic recording layer and a carbon protective film without breaking vacuum, thereby manufacturing a DTR media. A cross-section of the DTR media thus manufactured is observed with a TEM, with the result that the orientation of the magnetic crystal lattice on the recess is found to be disturbed, compared with that of the magnetic crystal lattice on the protrusion.

Example 7

In this Example, the crystal orientation on the surface of the recess is disturbed, compared with that on the surface of the protrusion. Specifically, a polymethyl methacrylate (PMMA) film is formed in a thickness of 80 nm on a Si disc substrate having a diameter of 1 inch by spin-coating. On the other hand, prepared is a Ni mold having circumferential protrusions with a pitch of 100 nm, a top width of 35 nm and a height of 30 nm and also having protrusions corresponding to the address signals and servo signals. These protrusions are formed by electron-beam lithography and plating. The Ni mold is pressed to the PMMA film so as to transfer the patterns of protrusions and recesses of the Ni mold onto the PMMA film. After the Ni mold is removed, the recess of the PMMA film is etched by means of the Ar ion milling so as to expose selectively the surface of Si disc substrate, followed by transferring the patterns of protrusions and recesses into the Si disc substrate. In this stage, the PMMA film on the protrusion is left unremoved. In the next step, the PMMA film is removed by using an organic solvent, thereby manufacturing a desired HDD substrate. A cross-section of the HDD substrate is observed with TEM, with the result that the crystal orientation on the surface of the Si crystal on the recess is found to have been disturbed by the irradiation with the Ar ions, compared with the crystal orientation on the surface of the Si crystal on the protrusion. The HDD substrate is found to have circumferential protrusions with a pitch of 100 nm, a top width of 60 nm and a height of 15 nm and to have patterns of protrusions and recesses corresponding to the address signals and servo signals.

The HDD substrate is loaded in a multi-chamber sputtering apparatus so as to form a soft underlayer, an orientation control film, a granular perpendicular magnetic recording layer, and a carbon protective film without breaking vacuum, thereby manufacturing a DTR media. A cross-section of the DTR media thus manufactured is observed with a TEM, with the result that the orientation of the magnetic crystal lattice on the recess is found to be disturbed, compared with that of the magnetic crystal lattice on the protrusion.

Example 8

In this Example, used on the surface of the recess is a surface modifying layer formed of a substance capable of reacting with a magnetic material and soluble in a solvent. Specifically, a polyvinyl alcohol (PVA) film is formed in a thickness of 100 nm on a Si/SiO$_2$ substrate having a diameter of 1.8 inches by spin-coating. On the other hand, prepared is a Ni mold having circumferential protrusions with a pitch of 150 nm, a top width of 50 nm and a height of 15 nm and also having protrusions corresponding to the address signals and servo signals. These protrusions are formed by electron-beam lithography and plating. The Ni mold is pressed to the PVA film so as to transfer the patterns of protrusions and recesses of the Ni mold onto the PVA film. After the Ni mold is removed, the recess of the PVA film is etched by Ar ion milling until the surface of the underlying glass substrate is exposed. Further, the patterns of protrusions and recesses are transferred into the glass substrate by RIE using a fluorine-based gas. In this stage, the PVA film on the protrusion is left unremoved. In the next step, the substrate is coated by spin-coating with a toluene solution of polyvinyl chloride having chlorine atoms that perform a reaction with the magnetic material, followed by removing the PVA film by a lift-off method using water, thereby manufacturing a desired HDD substrate. The HDD substrate is found to have circumferential protrusions with a pitch of 150 nm, a top width of 95 nm and a height of 10 nm and to have patterns of protrusions and recesses corresponding to the address signals and servo signals.

The HDD substrate is loaded in a multi-chamber sputtering apparatus so as to form a soft underlayer, an orientation control film, a granular perpendicular magnetic recording layer, and a carbon protective film without breaking vacuum, thereby manufacturing a DTR media. A cross-section of the DTR media thus manufactured is observed with a TEM, with the result that the orientation of the magnetic crystal lattice on the recess is found to be disturbed, compared with that of the magnetic crystal lattice on the protrusion.

Example 9

In this Example, a surface modifying layer formed on the surface of the recess is formed of a substance that can diffuse into a magnetic material. Specifically, a polyvinyl alcohol (PVA) film is formed in a thickness of 100 nm on a glass substrate having a diameter of 1.8 inches by spin-coating. On the other hand, prepared is a Ni mold having circumferential protrusions with a pitch of 150 nm, a top width of 50 nm and a height of 50 nm and also having protrusions corresponding to the address signals and servo signals. These protrusions are formed by electron-beam lithography and plating. The Ni mold is pressed to the PVA film so as to transfer the patterns of protrusions and recesses of the Ni mold onto the PVA film. After the Ni mold is removed, the recess of the PVA film is etched by Ar ion milling until the surface of the underlying glass substrate is exposed. Further, the patterns of protrusions and recesses are transferred into the glass substrate by RIE using a fluorine-based gas. In this stage, the PVA film on the protrusion is left unremoved. In the next step, a film of Cu that can diffuse into the magnetic material is formed by sputtering, followed by removing the PVA film by means of lift-off with water, thereby manufacturing a desired HDD substrate. The HDD substrate is found to have circumferential protrusions with a pitch of 150 nm, a top width of 90 nm and a height of 40 nm and to have patterns of protrusions and recesses corresponding to the address signals and servo signals.

The HDD substrate is loaded in a multi-chamber sputtering apparatus so as to form a soft underlayer, an orientation control film, a magnetic recording layer, and a carbon protective film without breaking vacuum, thereby manufacturing a DTR media. A cross-section of the DTR media thus manufactured is observed with a TEM, with the result that the orientation of the magnetic crystal lattice on the recess is found to be disturbed, compared with that of the magnetic crystal lattice on the protrusion.

Example 10

Figure 4:
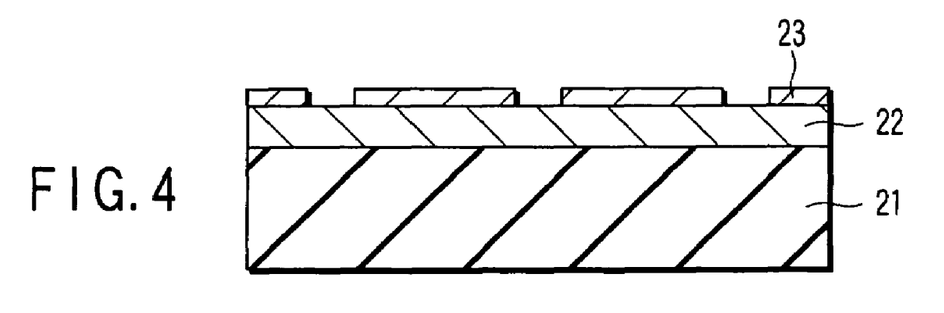
FIG. 4 is a cross-sectional view showing a substrate for a magnetic recording media (HDD substrate) according to another embodiment of the present invention.

FIG. 4 is a cross-sectional view showing an HDD substrate according to another embodiment of the present invention. As shown in the drawing, a soft underlayer 22 is formed on a glass substrate 21, and an orientation control film 23 made of Pd is formed on the soft underlayer 22. Circumferential protrusions corresponding to the recording tracks are formed by the orientation control film 23. The regions free from the orientation control film 23 form pattern of circumferential recesses corresponding to the grooves between the recording tracks.

Figure 5:
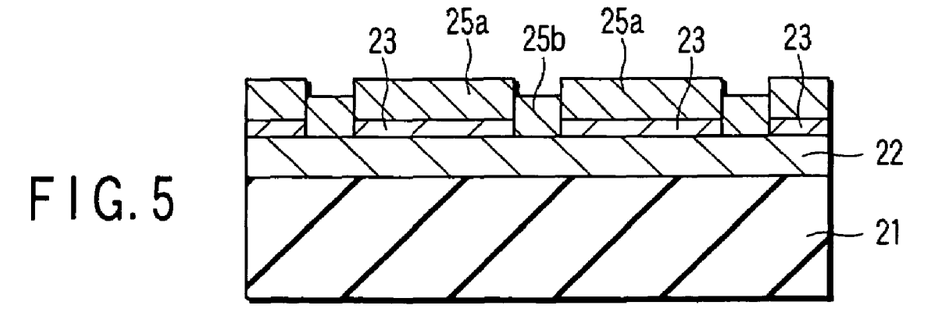
FIG. 5 is a cross-sectional view showing a magnetic recording media (DTR media) according to another embodiment of the present invention.

FIG. 5 is a cross-sectional view showing a magnetic recording media (DTR media) according to an embodiment of the present invention. As shown in the drawing, the soft underlayer 22 is formed on the glass substrate 21, and the orientation control film 23 made of Pd is formed on the soft underlayer 22 in a manner to form protrusions. Further, perpendicular magnetic recording layers 25a, 25b are formed on the entire surface. The reference numeral 25a denotes a perpendicular magnetic recording layer formed on the orientation control film 23 on the protrusions (recording tracks). In the regions, the magnetic orientation is good. Also, the reference numeral 25b denotes a perpendicular magnetic recording layer formed on the recesses (grooves). In the regions, the magnetic orientation is disturbed.

Figure 6A:
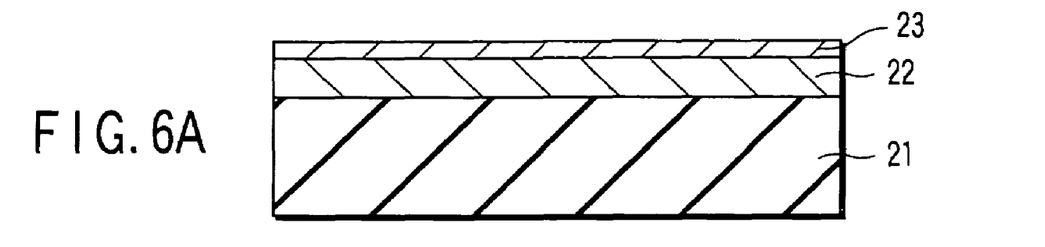
FIGS. 6A, 6B, 6C, 6D, 6E and 6F are cross-sectional views showing a method of manufacturing the HDD substrate shown in FIG. 4 and the DTR media shown in FIG. 5.
Figure 6B:
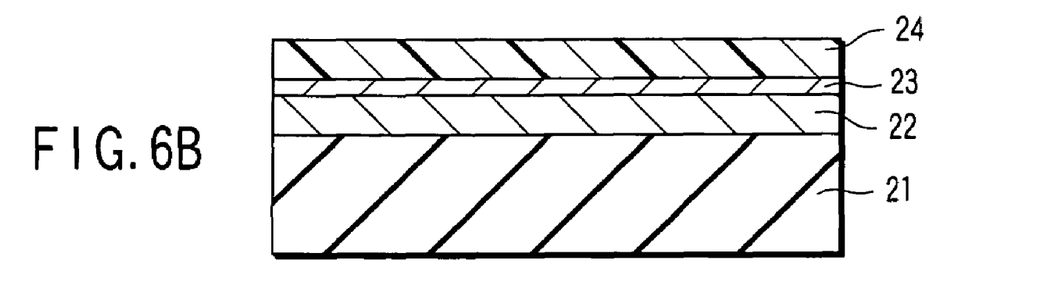
Figure 6C:
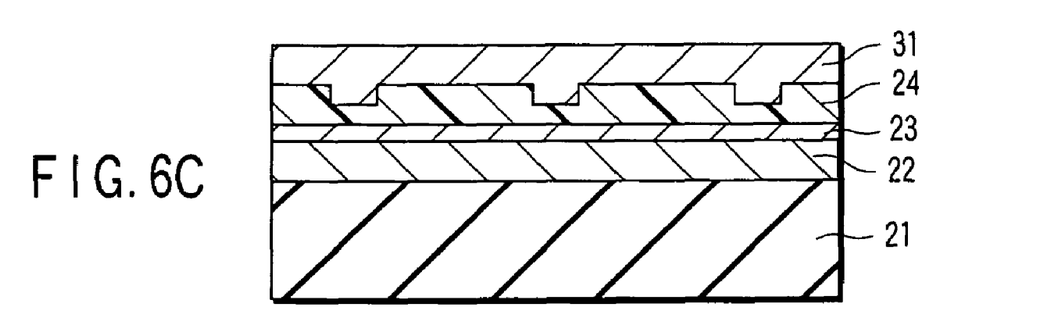
Figure 6D:
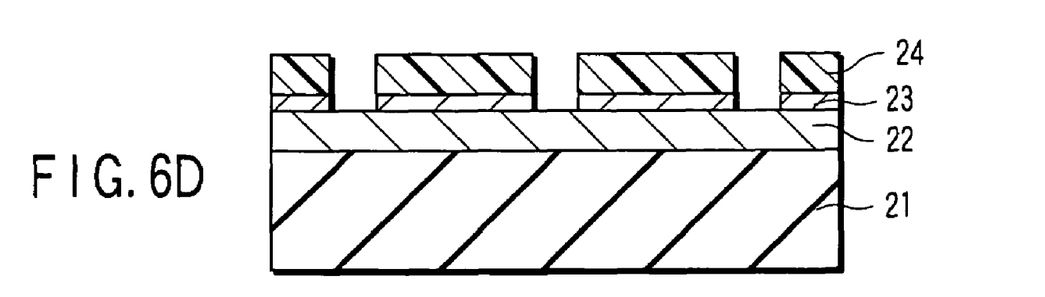
Figure 6E:
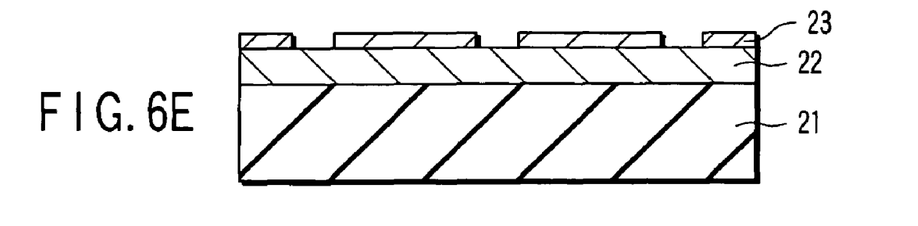

The manufacturing method of the HDD substrate shown in FIG. 4 and the DTR media shown in FIG. 5 will be described with reference to FIGS. 6A, 6B, 6C, 6D, 6E and 6F. In the first step, a glass substrate 21 having a diameter of 0.85 inch is loaded in a multi-chamber sputtering apparatus so as to form a soft underlayer 22 and an orientation control film 23 made of Pd, as shown in FIG. 6A. In the next step, a polymethyl methacrylate (PMMA) film 24 is formed on the orientation control film 23 by spin-coating in a thickness of 80 nm, as shown in FIG. 6B. On the other hand, prepared is a Ni mold 31 having circumferential protrusions with a pitch of 100 nm, a top width of 35 nm and a height of 30 nm also having protrusions corresponding to the address signals and servo signals. These protrusions are formed by electron-beam lithography and plating. The Ni mold 31 is pressed to the PMMA film 24 so as to transfer the patterns of protrusions and recesses of the Ni mold 31 onto the PMMA film 24, as shown in FIG. 6C. After the Ni mold 31 is removed, patterns of protrusions and recesses are formed on the orientation control film 23 by Ar ion milling. At this stage, the PMMA 24 film is left unremoved on the protrusion. In the next step, the PMMA film is removed by using an organic solvent so as to form the HDD substrate shown in FIG. 4 as shown in FIG. 6E. The HDD substrate thus formed included circumferential protrusions with a pitch of 100 nm, a top width of 55 nm and a height of 15 nm and also included patterns of protrusions and recesses corresponding to the address signals and servo signals.

Figure 6F:
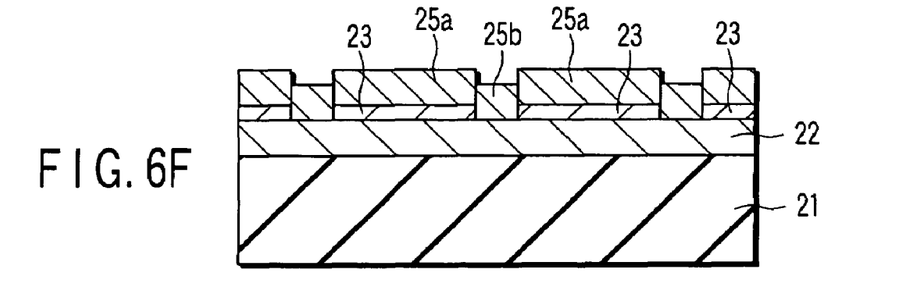

The HDD substrate is loaded in a multi-chamber sputtering apparatus so as to form a perpendicular magnetic recording layer of a granular structure, and a carbon protective film without breaking vacuum so as to obtain a DTR media as shown in FIG. 6F. A cross-section of the DTR media thus obtained is observed with a TEM, with the result that the orientation of the perpendicular magnetic crystals in the perpendicular magnetic recording layer 25b on the recess is found to be disturbed, compared with that of the perpendicular magnetic crystals in the perpendicular magnetic recording layer 25a on the protrusion.

Figure 7:
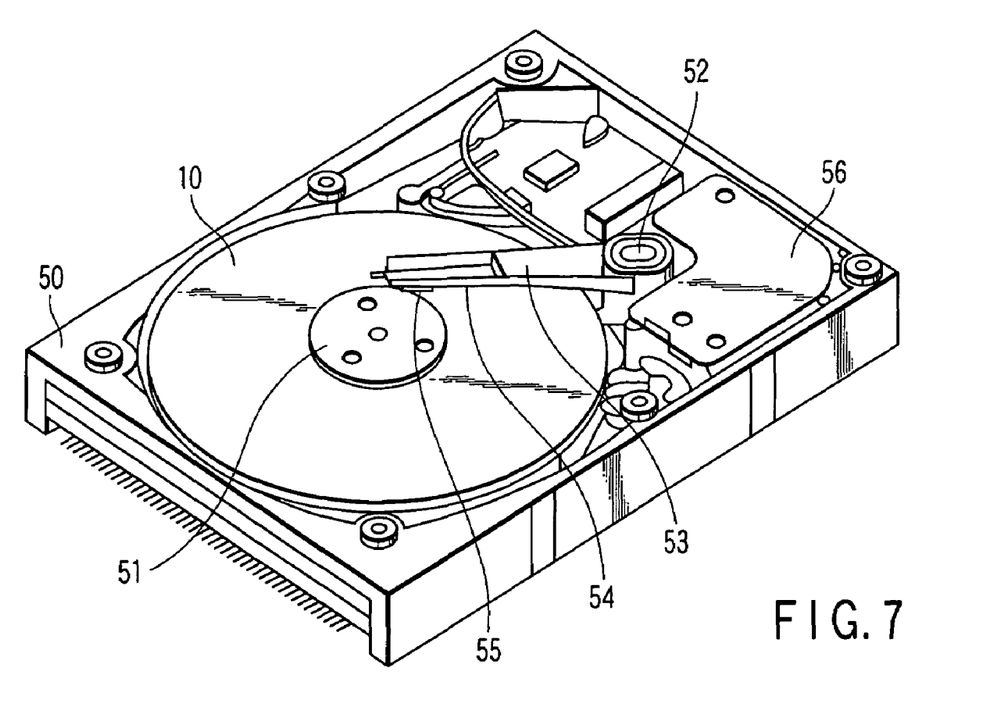
FIG. 7 is a perspective view showing a magnetic recording apparatus according to an embodiment of the present invention.

FIG. 7 is a perspective view showing a magnetic recording apparatus according to an embodiment of the present invention. As shown in the drawing, the magnetic recording apparatus comprises a chassis 50. Arranged within the chassis 50 are a magnetic recording media (DTR media) 10, a spindle motor 51 for rotating the DTR media 10, a head slider 55, a head suspension assembly for supporting the head slider 55 (i.e., combination of a suspension 54 and an actuator arm 53), a voice coil motor (VCM) 56 and a circuit board. The DTR media 10 is mounted to the spindle motor 51 so as to be rotated by the spindle motor 51, with the result that various digital data are recorded in the DTR media 10. The magnetic head incorporated in the head slider 55 is a so-called integrated type including a single pole head and a GMR element. The suspension 54 is held at one end of the actuator arm 53, and the head slider 55 is supported by the suspension 54 in a manner to face the recording surface of the DTR media 10. The actuator arm 53 is mounted to a pivot 52. The voice coil motor (VCM) 56 is mounted as an actuator at the other end of the actuator arm 53. The head suspension assembly is actuated by the voice coil motor (VCM) 56 so as to permit the magnetic head to be positioned over arbitrary radial position of the DTR media 10. The circuit board comprises a head IC so as to generate driving signals for the voice coil motor (VCM) and control signals for controlling read/write performed by the magnetic head.

The DTR media manufactured in each of the Examples and the Comparative Examples described above is coated with a lubricant having a fluorinated alkyl group so as to manufacture the magnetic recording apparatus shown in FIG. 7. In the DTR media having circumferential protrusions with a pitch of 100 nm, the width of the read magnetic sensor is set at 55 nm and the width of the single pole head is set at 70 nm. In the DTR media having circumferential protrusions formed at a pitch of 150 nm, the width of the read magnetic sensor is set at 80 nm and the width of the single pole head is set at 100 nm. The DTR media is rotated at a rotating speed of 5,000 rpm and read/write is performed using a head slider with a flying height of 10 nm. Table 1 shows the SNR of the output signals.

In Example 1, the SNR is found to be 15 dB, whereas the SNR for Comparative Example 1 is found to be only 12 dB. Similarly, the SNR for Example 2 is found to be 18 dB, whereas the SNR for Comparative Example 2 is found to be only 14 dB. The experimental data support that the SNR is lowered by the magnetic signals from the recesses in the Comparative Examples. However, it is possible to overcome the difficulty in the Examples of the present invention.

TABLE 1

|  | SNR (dB) |
| --- | --- |
| Example 1 | 15 |
| Comparative Example 1 | 12 |
| Example 2 | 18 |
| Comparative Example 2 | 14 |
| Example 3A | 17 |
| Example 3B | 18 |
| Example 4A | 18 |
| Example 4B | 18.5 |
| Example 5A | 15 |
| Example 5B | 15.5 |
| Example 6 | 19 |
| Example 7 | 14.5 |
| Example 8 | 14.5 |
| Example 9 | 16 |
| Example 10 | 15.5 |

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A substrate for magnetic recording media on which a granular magnetic layer is to be formed on the substrate, comprising: circumferential protrusions corresponding to recording tracks and circumferential recesses corresponding to grooves between the recording tracks;

where in the recesses have a selectively formed surface modifying layer of a containing an organic fluorine compound, the fluorine compound in the recesses rendering surface energy in the recesses less than surface energy of the protrusions; a magnetic layer in recesses and protrusions where orientation of the magnetic layer formed on the fluorine compound in the recesses have a more disturbed lattice than that formed on the protrusions.

2. The substrate according to claim 1, wherein the substance containing fluorine is fluoroalkylsilane.

3. The substrate according to claim 1, wherein the difference in height between the protrusion and the recess ranges between 10 and 100 nm.

4. The substrate according to claim 1, wherein the substrate is formed of glass or silicon.

5. A magnetic recording media, comprising:
the substrate for a magnetic recording media according to claim 1; and
a granular magnetic layer formed on the substrate for the magnetic recording media,
the orientation of the magnetic crystal lattice of the magnetic layer on the recess being more disturbed than that of the magnetic layer on the protrusion.

6. A magnetic recording apparatus, comprising:
the magnetic recording media according to claim 5; and
a magnetic head.

7. A discrete track recording media, comprising:
a substrate formed of glass or silicon, the substrate comprising circumferential protrusions corresponding to recording tracks and circumferential recesses corresponding to grooves between the recording tracks, a difference in height between the protrusion and the recess ranging from 10 to 100 nm, a surface of the recess being modified with an organic compound substance containing fluorine rendering surface energy in the recesses less than surface energy of the protrusions; and
a granular magnetic layer formed on the substrate, the orientation of the magnetic crystal lattice of the magnetic layer on the recess being more disturbed than that of the magnetic layer on the protrusion.

* * * * *